US010325488B2

United States Patent
Suzuki et al.

(10) Patent No.: US 10,325,488 B2
(45) Date of Patent: Jun. 18, 2019

(54) IMAGE DISPLAY DEVICE

(71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/877,859

(22) Filed: Jan. 23, 2018

(65) Prior Publication Data

US 2018/0261080 A1    Sep. 13, 2018

(30) Foreign Application Priority Data

Mar. 10, 2017    (JP) .................. 2017-046045

(51) Int. Cl.
*B60Q 1/50*    (2006.01)
*G08G 1/16*    (2006.01)
(Continued)

(52) U.S. Cl.
CPC .............. *G08G 1/005* (2013.01); *B60Q 1/50* (2013.01); *G08G 1/166* (2013.01); *G09G 3/001* (2013.01); *G09G 2380/10* (2013.01)

(58) Field of Classification Search
None
See application file for complete search history.

(56) References Cited

U.S. PATENT DOCUMENTS 5,654,705 A     8/1997   Houten et al.
6,662,108 B2 *  12/2003  Miller .................... G08G 1/164
                                                                340/435
(Continued)

FOREIGN PATENT DOCUMENTS

EP      2233356 A1      9/2010
JP      11-263145 A     9/1999
(Continued)

OTHER PUBLICATIONS

Japanese Office Action issued in corresponding Japanese Patent Application No. 2017-046045, dated Jul. 24, 2018, with English Translation.
(Continued)

*Primary Examiner* — Fekadeselassie Girma
(74) *Attorney, Agent, or Firm* — McDermott Will & Emery LLP

(57) ABSTRACT

An image display device includes a light illuminator, a space detector, a travel information acquirer, a possibility calculator, and an illumination controller. The light illuminator is configured to send out light frontward of a first vehicle as an own vehicle, to display an image on a road a pedestrian is going to cross. The space detector is configured to detect a travel space sideward of the first vehicle. The possibility calculator is configured to calculate travel possibility that a second vehicle other than the first vehicle travels through the travel space, on the basis of travel information acquired by the travel information acquirer and on the basis of a position of the travel space detected by the space detector. The illumination controller is configured to control the light illuminator to display a no-crossing image on the condition that the travel possibility is equal to or larger than a predetermined value.

16 Claims, 6 Drawing Sheets

(51) Int. Cl.
*G09G 3/00* (2006.01)
*G08G 1/005* (2006.01)

(56) References Cited

U.S. PATENT DOCUMENTS

| | | | |
|---|---|---|---|
| 8,269,652 B2* | 9/2012 | Seder | G01S 13/723 |
| | | | 340/435 |
| 8,954,252 B1* | 2/2015 | Urmson | G08G 1/166 |
| | | | 180/167 |
| 8,996,224 B1* | 3/2015 | Herbach | G05D 1/0011 |
| | | | 180/116 |
| 9,135,754 B2 | 9/2015 | Ng-Thow-Hing et al. | |
| 9,475,422 B2* | 10/2016 | Hillis | B60Q 1/26 |
| 9,558,409 B2* | 1/2017 | Pliefke | B60R 1/00 |
| 9,575,176 B2* | 2/2017 | Baba | G01S 13/867 |
| 9,654,738 B1* | 5/2017 | Ferguson | H04N 7/18 |
| 9,849,784 B1* | 12/2017 | Chan | B60K 35/00 |
| 9,896,107 B1* | 2/2018 | Huang | B60W 30/18163 |
| 9,902,311 B2* | 2/2018 | Sweeney | B60Q 1/2611 |
| 9,905,132 B2* | 2/2018 | Habu | B60Q 5/006 |
| 9,925,989 B2* | 3/2018 | Lee | B60W 50/14 |
| 9,947,221 B1* | 4/2018 | Mazzola | G08G 1/096783 |
| 9,952,054 B2 | 4/2018 | An et al. | |
| 9,969,326 B2 | 5/2018 | Ross et al. | |
| 9,978,280 B2 | 5/2018 | Lee et al. | |
| 9,988,047 B2* | 6/2018 | Johnson | B60W 30/12 |
| 10,048,688 B2* | 8/2018 | Ramasamy | G05D 1/0088 |
| 10,089,537 B2* | 10/2018 | Nix | G06K 9/00805 |
| 2002/0140555 A1 | 10/2002 | Jette et al. | |
| 2005/0278098 A1* | 12/2005 | Breed | B60R 21/0134 |
| | | | 701/45 |
| 2006/0055525 A1* | 3/2006 | Kubota | G08G 1/0962 |
| | | | 340/461 |
| 2007/0067081 A1 | 3/2007 | Ton | |
| 2008/0040004 A1* | 2/2008 | Breed | B60R 21/0134 |
| | | | 701/45 |
| 2008/0175012 A1 | 7/2008 | Shimaoka et al. | |
| 2008/0243389 A1* | 10/2008 | Inoue | G08G 1/165 |
| | | | 701/301 |
| 2008/0312832 A1* | 12/2008 | Greene | G08G 1/165 |
| | | | 701/301 |
| 2008/0312833 A1* | 12/2008 | Greene | G06K 9/00805 |
| | | | 701/301 |
| 2009/0160678 A1* | 6/2009 | Turnbull | B60Q 1/525 |
| | | | 340/944 |
| 2010/0030474 A1* | 2/2010 | Sawada | B62D 15/0265 |
| | | | 701/301 |
| 2010/0082251 A1* | 4/2010 | Kogure | B60T 8/17558 |
| | | | 701/301 |
| 2011/0128139 A1* | 6/2011 | Tauchi | B60K 35/00 |
| | | | 340/439 |
| 2011/0184617 A1* | 7/2011 | Hegemann | B60T 7/22 |
| | | | 701/70 |
| 2012/0140988 A1* | 6/2012 | Takahashi | G06K 9/00805 |
| | | | 382/103 |
| 2012/0194356 A1 | 8/2012 | Haines et al. | |
| 2012/0224060 A1 | 9/2012 | Gurevich et al. | |
| 2013/0057690 A1 | 3/2013 | Mitsugi | |
| 2014/0062685 A1* | 3/2014 | Tamatsu | B60Q 5/005 |
| | | | 340/425.5 |
| 2014/0152488 A1* | 6/2014 | Baba | G01S 13/867 |
| | | | 342/70 |
| 2015/0103174 A1* | 4/2015 | Emura | B60R 1/00 |
| | | | 348/148 |
| 2015/0179073 A1* | 6/2015 | Suzuno | G08G 1/005 |
| | | | 701/45 |
| 2015/0194082 A1 | 7/2015 | McEwan | |
| 2015/0334269 A1* | 11/2015 | Yokota | G06K 9/00805 |
| | | | 382/103 |
| 2016/0039286 A1* | 2/2016 | Shibata | B60K 35/00 |
| | | | 701/36 |
| 2016/0093207 A1* | 3/2016 | Di Censo | H04R 1/1091 |
| | | | 340/944 |
| 2016/0115650 A1 | 4/2016 | Leung | |
| 2016/0247393 A1 | 8/2016 | Okamoto et al. | |
| 2016/0332568 A1 | 11/2016 | Kim | |
| 2017/0043705 A1* | 2/2017 | Mizuno | F21S 41/25 |
| 2017/0140651 A1* | 5/2017 | Lee | G08G 1/166 |
| 2017/0182934 A1* | 6/2017 | Arita | B60Q 1/50 |
| 2017/0210283 A1 | 7/2017 | Ishida | |
| 2017/0217361 A1* | 8/2017 | Miller | B60Q 1/22 |
| 2017/0217368 A1* | 8/2017 | Lewis | B60R 1/00 |
| 2017/0217422 A1* | 8/2017 | Nakamura | B60W 30/09 |
| 2017/0240096 A1* | 8/2017 | Ross | B60Q 1/50 |
| 2017/0253177 A1* | 9/2017 | Kawamata | B60Q 1/50 |
| 2017/0253181 A1* | 9/2017 | Choi | B60Q 9/008 |
| 2017/0259734 A1 | 9/2017 | Imaishi et al. | |
| 2017/0276308 A1 | 9/2017 | Nakazawa et al. | |
| 2017/0330463 A1* | 11/2017 | Li | B60K 37/04 |
| 2017/0337821 A1 | 11/2017 | Masuda et al. | |
| 2017/0372613 A1* | 12/2017 | Habu | B60Q 5/006 |
| 2018/0009374 A1* | 1/2018 | Kim | G03B 21/2053 |
| 2018/0024562 A1* | 1/2018 | Bellaiche | G01S 19/48 |
| | | | 701/26 |
| 2018/0025235 A1* | 1/2018 | Fridman | G08G 1/096725 |
| | | | 382/103 |
| 2018/0033306 A1* | 2/2018 | Kim | B60Q 5/00 |
| 2018/0086346 A1* | 3/2018 | Fujisawa | B60Q 3/18 |
| 2018/0118099 A1* | 5/2018 | Kunii | B60Q 1/04 |
| 2018/0118106 A1* | 5/2018 | You | B60Q 5/008 |
| 2018/0134286 A1* | 5/2018 | Yi | B60W 10/04 |
| 2018/0141484 A1 | 5/2018 | Haneda et al. | |
| 2018/0173234 A1* | 6/2018 | Van Laack | G06K 9/00362 |
| 2018/0173237 A1* | 6/2018 | Reiley | G05D 1/0214 |
| 2018/0218601 A1* | 8/2018 | Aoki | B60W 50/0097 |
| 2018/0247540 A1* | 8/2018 | Hagawa | B60W 50/14 |
| 2018/0250596 A1* | 9/2018 | Kim | A63F 13/63 |
| 2018/0253609 A1* | 9/2018 | Potter | G06K 9/00791 |
| 2018/0257547 A1* | 9/2018 | Suzuki | B60Q 1/50 |
| 2018/0257549 A1* | 9/2018 | Suzuki | B60Q 1/50 |
| 2018/0257550 A1* | 9/2018 | Suzuki | B60Q 1/50 |
| 2018/0261080 A1* | 9/2018 | Suzuki | B60Q 1/50 |
| 2018/0261081 A1* | 9/2018 | Suzuki | B60Q 9/008 |

FOREIGN PATENT DOCUMENTS

| | | |
|---|---|---|
| JP | 2006-252264 A | 9/2006 |
| JP | 2008-007079 A | 1/2008 |
| JP | 2008-143510 A | 6/2008 |
| JP | 2009-149152 A | 7/2009 |
| JP | 2009-230701 A | 10/2009 |
| JP | 4720650 B2 | 7/2011 |
| JP | 2013-203251 A | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 A | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Japanese Office Action issued in corresponding Japanese Patent Application No. 2017-046049, dated Aug. 7, 2018, with English Translation.
Japanese Office Action issue in corresponding Japanese Patent Application No. 2017-046452, dated Aug. 21, 2018, with English Translation.
U.S. Non-Final Office Action issued in related U.S. Appl. No. 15/888,858, dated Jul. 24, 2018.
Non-Final Office Action, dated Jan. 2, 2019, issued in related U.S. Appl. No. 15/890,918.
Japanese Office Action dated Jul. 24, 2018, with English Translation, issued in related Japanese Patent Application No. 2017-046047.

(56) References Cited

OTHER PUBLICATIONS

Japanese Office Action dated Aug. 7, 2018, with English Translation, issued in related Japanese Patent Application No. 2017-046050.
Japanese Office Action dated Sep. 11, 2018, with English Translation, issued in related Japanese Patent Application No. 2017-046052.
Non-Final Office Action dated Jul. 11, 2018, issued in related U.S. Appl. No. 15/890,963.
Non-Final Office Action dated Oct. 25, 2018, issued in related U.S. Appl. No. 15/888,791.
Non-Final Office Action dated Jun. 4, 2018, issued in related U.S. Appl. No. 15/877,901.
Final Office Action dated Oct. 30, 2018, issued in related U.S. Appl. No. 15/877,901.
Japanese Decision to Grant a Patent issued in corresponding Japanese Patent Application No. 2017-046045, dated Oct. 2, 2018, with English Translation.
Notice of Allowance issued in related U.S. Appl. No. 15/890,963, dated Dec. 19, 2018.
Notice of Allowance issued in related U.S. Appl. No. 15/888,858, dated Feb. 8, 2019.
Notice of Allowance issued in related U.S. Appl. No. 15/888,791, dated Mar. 15, 2019.
Notice of Allowance issued in related U.S. Appl. No. 15/877,901, dated Feb. 20, 2019.

* cited by examiner

IMAGE DISPLAY DEVICE

CROSS-REFERENCE TO RELATED APPLICATIONS

The present application claims priority from Japanese Patent Application No. 2017-046045 filed on Mar. 10, 2017, the entire contents of which are hereby incorporated by reference.

BACKGROUND

The technology relates to an image display device that displays an image on a road.

Some image display devices send out light frontward of an own vehicle, to display an image on a road. For example, such an image display device displays an image of permission to cross a road for a pedestrian, and thereby lets the pedestrian know the driver's intention, attempting to allow the pedestrian to cross safely.

In some cases, a surrounding vehicle such as a following vehicle and an oncoming vehicle may fail in recognizing the pedestrian who crosses the road in accordance with the image of the permission to cross the road displayed by the own vehicle. This contributes to possibility that the surrounding vehicle may run into the pedestrian who crosses the road. Therefore, pursued is an image display device that checks whether the surrounding vehicle approaches and guides the pedestrian safely.

As a technique of guiding the pedestrian safely, for example, Japanese Patent (JP-B) No. 4720650 proposes a road-surface projection device that gives an easily understandable warning to a moving body such as a pedestrian. The road-surface projection device provides highlighted display of an image of a stop line, in a case where a surrounding vehicle approaches. This makes it possible to guide the pedestrian safely.

SUMMARY

As described, in an image display device that sends out light frontward of the own vehicle, it is desired to display an appropriate image for a pedestrian.

It is desirable to provide an image display device that makes it possible to display an appropriate image for a pedestrian.

An aspect of the technology provides an image display device including a light illuminator, a space detector, a travel information acquirer, a possibility calculator, and an illumination controller. The light illuminator is configured to send out light frontward of a first vehicle as an own vehicle, to display an image on a road a pedestrian is going to cross. The space detector is configured to detect a travel space sideward of the first vehicle. The travel space is a space through which a second vehicle other than the first vehicle is able to travel. The travel information acquirer is configured to acquire travel information regarding how the second vehicle travels on the road. The possibility calculator is configured to calculate travel possibility that the second vehicle travels through the travel space, on the basis of the travel information acquired by the travel information acquirer and on the basis of a position of the travel space detected by the space detector. The illumination controller is configured to control the light illuminator to display a no-crossing image on the condition that the travel possibility calculated by the possibility calculator is equal to or larger than a predetermined value. The no-crossing image prohibits the pedestrian from crossing the road.

An aspect of the technology provides an image display device including a light illuminator, a space detector, a travel information acquirer, and circuitry. The light illuminator is configured to send out light frontward of a first vehicle as an own vehicle, to display an image on a road a pedestrian is going to cross. The space detector is configured to detect a travel space sideward of the first vehicle. The travel space is a space through which a second vehicle other than the first vehicle is able to travel. The travel information acquirer is configured to acquire travel information regarding how the second vehicle travels on the road. The circuitry is configured to control the light illuminator, on the basis of the travel information acquired by the travel information acquirer and on the basis of a position of the travel space detected by the space detector. The circuitry is configured to calculate travel possibility that the second vehicle travels through the travel space, on the basis of the travel information acquired by the travel information acquirer and on the basis of the position of the travel space detected by the space detector. The circuitry is configured to control the light illuminator to display a no-crossing image on the condition that the travel possibility is equal to or larger than a predetermined value. The no-crossing image prohibits the pedestrian from crossing the road.

DETAILED DESCRIPTION

In the following, some implementations of the technology are described with reference to the drawings.

[First Implementation]

Figure 1:
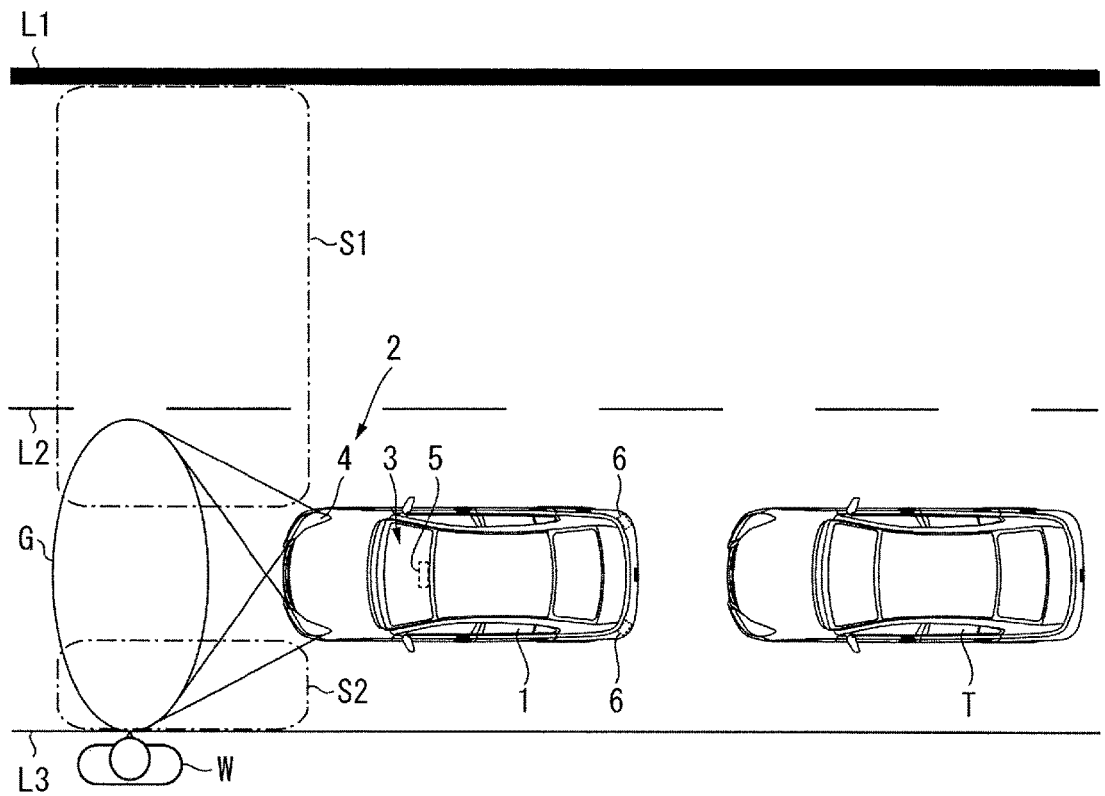
FIG. 1 illustrates a configuration of an automobile including an image display device according to a first implementation of the technology.

FIG. 1 illustrates a configuration of an automobile including an image display device according to a first implementation of the technology. The automobile may include an automobile body 1 and an image display device 2.

The automobile body 1 may include headlights and a front windshield. The headlights may be disposed in a front part of the automobile body 1. The front windshield may be disposed on front side of a driver's seat where a driver drives the automobile.

The image display device 2 may include an operation unit 3, a light illuminator 4, a space detector 5, and a motion detector 6. The operation unit 3 may be disposed near the driver's seat of the automobile body 1. The light illuminator 4 may be disposed in the front part of the automobile body 1. The space detector 5 may be disposed near an upper part of the front windshield. The motion detector 6 may be disposed in a rear part of the automobile body 1.

The operation unit 3 may be a unit with which the driver performs an operation of the image display device 2.

The light illuminator 4 sends out light frontward of the automobile body 1, to display an image G on a road a pedestrian W is going to cross. The light illuminator 4 may be unitized with the headlights of the automobile body 1. The light illuminator 4 may display, for example, a permission-to-cross image and a no-crossing image. The permission-to-cross image permits the pedestrian W to cross. The no-crossing image prohibits the pedestrian W from crossing.

The permission-to-cross image may include, for example, image display of a crosswalk and character display of "Please Cross". The no-crossing image may include, for example, image display of a stop line, character display of "No Crossing", and character display of "Watch Out for Cars Approaching".

It is to be noted that the term "pedestrian W" means, for example, a person who passes along a sidewalk, and a person who rides a bicycle along a road end.

The space detector 5 may detect passing spaces S1 and S2 sideward of the automobile body 1. The passing spaces S1 and S2 are spaces in which a following vehicle T passes by the automobile body 1. In other words, the space detector 5 may detect the passing spaces S1 and S2, on a road on one side on which a surrounding vehicle travels in the same direction as the own vehicle, out of roads on both sides of a centerline L1 of a driveway. At this occasion, the space detector 5 may be able to detect the passing spaces S1 and S2 on the basis of, for example, the centerline L1 of the driveway, a lane borderline L2, and an outline L3 of the driveway. In other words, the space detector 5 may detect, as the passing space S1, a space between a right side of the automobile body 1 and the centerline L1 of the driveway, and detect, as the passing space S2, a space between a left side of the automobile body 1 and the outline L3 of the driveway. In one preferred but non-limiting example, the space detector 5 may include, for example, a camera.

In one implementation of the technology, the automobile body 1 may serve as a "first vehicle". In one implementation of the technology, the following vehicle T may serve as a "second vehicle". The term "following vehicle T" means an automobile, a motorbike, and a bicycle.

The motion detector 6 detects a motion of the following vehicle T. As the motion detector 6, for example, laser radar, millimeter wave radar, an ultrasonic sensor, and a camera may be used. In one specific but non-limiting example, the motion detector 6 may detect, for example, an advancing direction, a speed, and acceleration of the following vehicle T.

In one implementation of the technology, the motion detector 6 may serve as a "travel information acquirer".

Description is given next of details of the image display device 2.

Figure 2:
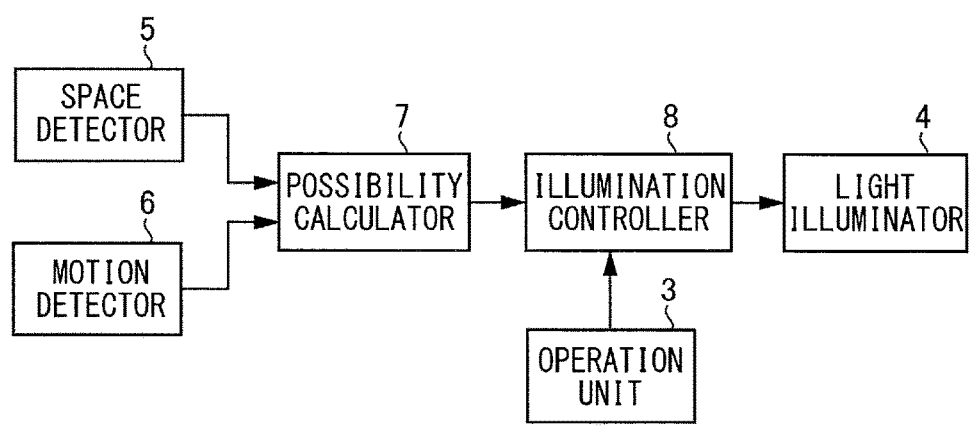
FIG. 2 is a block diagram of a configuration of the image display device.

Referring to FIG. 2, the image display device 2 includes a possibility calculator 7. The possibility calculator 7 may be coupled to the space detector 5 and the motion detector 6. The possibility calculator 7 may be coupled to the light illuminator 4 through an illumination controller 8. Moreover, the operation unit 3 may be coupled to the illumination controller 8.

The operation unit 3 may allow the driver who drives the automobile body 1 to operate the light illuminator 4 through the illumination controller 8.

The possibility calculator 7 may predict a route of the following vehicle T, on the basis of the motion of the following vehicle T detected by the motion detector 6 and on the basis of positions of the passing spaces S1 and S2 detected by the space detector 5. The possibility calculator 7 calculates travel possibility that the following vehicle T travels through the passing space S1 or S2.

The illumination controller 8 may determine whether or not the travel possibility calculated in the possibility calculator 7 is equal to or larger than a predetermined value. In a case where the travel possibility is equal to or larger than the predetermined value, the illumination controller 8 may control the light illuminator 4 to display the no-crossing image for the pedestrian W. The no-crossing image prohibits the pedestrian W from crossing the road. In a case where the travel possibility is smaller than the prescribed value, the illumination controller 8 may control the light illuminator 4 in accordance with the operation performed with the operation unit 3.

It is to be noted that the possibility calculator 7 and the illumination controller 8 may include a central processing unit (CPU) and an operation program that causes the CPU to perform various kinds of processing. However, the possibility calculator 7 and the illumination controller 8 may include a digital circuit.

In one implementation of the technology, the possibility calculator 7 may serve as a "possibility calculator". In one implementation of the technology, the illumination controller 8 may serve as an "illumination controller". In one implementation of the technology, the possibility calculator 7 and the illumination controller 8 may serve as "circuitry".

Description now moves on to operation according to the first implementation.

First, as illustrated in FIG. 1, the driver who drives the automobile body 1 causes the own vehicle to stop in front of the pedestrian W who waits to cross the road. Here, assume that the following vehicle T is traveling rearward of the own vehicle on the same lane as the own vehicle. In accordance with the stop of the own vehicle, the following vehicle T stops rearward of the own vehicle. Thereafter, the driver of the own vehicle operates the operation unit 3, to allow the light illuminator 4 to display the permission-to-cross image for the pedestrian W.

At this occasion, the space detector 5 detects the passing spaces S1 and S2 sideward of the own vehicle in which the following vehicle T is able to pass by. The motion detector 6 detects the motion of the following vehicle T. It is to be noted that in one preferred but non-limiting example, as the passing spaces S1 and S2, detected may be spaces that extend frontward of the own vehicle from near the front part of the own vehicle.

Figure 3:
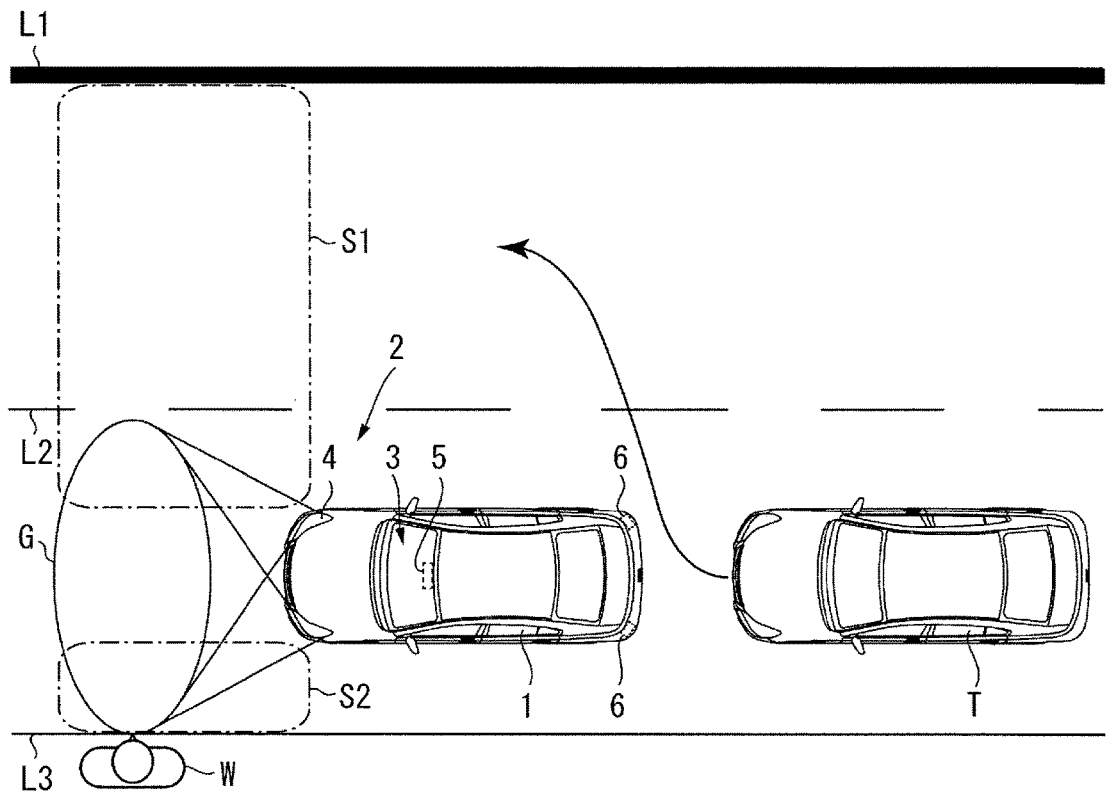
FIG. 3 illustrates how a motion detector detects a motion of a following vehicle.

Here, referring to FIG. 3, in a case where the following vehicle T moves from the same lane as the own vehicle, beyond the lane borderline L2 of the driveway, to a lane on right side of the own vehicle, the motion of the following vehicle T is detected by the motion detector 6.

That way, information regarding the passing spaces S1 and S2 detected by the space detector 5 and information regarding the motion of the following vehicle T detected by the motion detector 6 are inputted to the possibility calculator 7, as illustrated in FIG. 2. The possibility calculator 7 predicts the route of the following vehicle T on the basis of the advancing direction of the following vehicle T detected by the motion detector 6, and calculates whether or not the route of the following vehicle T includes the passing space S1 or S2. In a case where the route of the following vehicle T includes the passing space S1, the possibility calculator 7 brings the travel possibility that the following vehicle T travels through the passing space S1, to the predetermined value or more.

Thus, the possibility calculator 7 is able to calculate the travel possibility that the following vehicle T travels through the passing space S1, on the basis of the advancing direction of the following vehicle T and on the basis of the positions of the passing spaces S1 and S2.

Moreover, in one preferred but non-limiting example, the possibility calculator 7 may perform calculation as to whether or not the following vehicle T passes through the passing space S1, i.e., whether or not the following vehicle T passes by the own vehicle, on the basis of the speed and the acceleration of the following vehicle T detected by the motion detector 6. In a case where a calculation result is obtained that the following vehicle T is unlikely to pass through the passing space S1, the possibility calculator 7 may reduce the travel possibility to a lower value than the predetermined value, even if the route of the following vehicle T includes the passing space S1.

Thus, the possibility calculator 7 is able to calculate the travel possibility on the basis of the advancing direction, the speed, and the acceleration of the following vehicle T.

In this way, the travel possibility calculated by the possibility calculator 7 is outputted from the possibility calculator 7 to the illumination controller 8. In a case where the travel possibility supplied from the possibility calculator 7 is equal to or larger than the predetermined value, the illumination controller 8 may control the light illuminator 4, to compulsively display the no-crossing image on the road, regardless of the operation performed with the operation unit 3. In a case where the travel possibility is smaller than the predetermined value, the illumination controller 8 may allow the light illuminator 4 to display the permission-to-cross image on the road, in accordance with the operation performed with the operation unit 3. For example, in a case where the calculation result is obtained by the possibility calculator 7 that the following vehicle T is unlikely to pass through the passing space S1, the illumination controller 8 may display the permission-to-cross image in accordance with the operation performed with the operation unit 3. In a case where the following vehicle T remains stopped rearward of the own vehicle and no motion of the following vehicle T is detected by the motion detector 6, the illumination controller 8 may display the permission-to-cross image in accordance with the operation performed with the operation unit 3.

It is to be noted that in one preferred but non-limiting example, the possibility calculator 7 may calculate the travel possibility per each of the passing spaces S1 and S2. In a case where the travel possibility is equal to or larger than the predetermined value with respect to one or both of the passing spaces S1 and S2, the illumination controller 8 may control the light illuminator 4 to display the no-crossing image.

As described, in the image display device 2, the travel possibility that the following vehicle T travels through the passing space S1 is calculated on the basis of the information regarding the passing spaces S1 and S2 detected by the space detector 5 and on the basis of the information regarding the motion of the following vehicle T detected by the motion detector 6. On the basis of the travel possibility thus calculated, the image G is displayed on the road. Hence, it is possible to display the appropriate image G for the pedestrian W. However, for example, the road-surface projection device as described in JP-B No. 4720650 checks solely whether a surrounding vehicle approaches. It is therefore difficult to display an appropriate image for a pedestrian. Specifically, for example, even in a case where the following vehicle T approaches but there is no possibility that the following vehicle T passes by the own vehicle, the road-surface projection device displays the no-crossing image that prohibits the pedestrian W from crossing the road. This possibly makes the pedestrian feel unnecessary anxiety. In contrast, in the image display device 2, the travel possibility that the following vehicle T travels through the passing space S1 is calculated on the basis of the information regarding the passing spaces S1 and S2 detected by the space detector 5 and on the basis of the information regarding the motion of the following vehicle T detected by the motion detector 6. On the basis of the travel possibility thus calculated, the image G is displayed on the road. It is therefore possible to compulsorily display the no-crossing image on the road, for example, in a case where the following vehicle T approaches and there is possibility that the following vehicle T passes by the own vehicle. It is possible to display the permission-to-cross image in accordance with the operation performed with the operation unit 3, for example, in a case where the following vehicle T approaches but there is no possibility that the following vehicle T passes by the own vehicle. As a result, in the image display device 2, it is possible to display the appropriate image G for the pedestrian W.

As described, in this implementation, the possibility calculator 7 calculates the travel possibility that the following vehicle T travels through the passing space S1 or S2, on the basis of the motion of the following vehicle T detected by the motion detector 6 and on the basis of the positions of the passing spaces S1 and S2 detected by the space detector 5. Hence, it is possible to display the appropriate image G for the pedestrian W.

[Second Implementation]

In one preferred but non-limiting example, in the first implementation, a width detector may be further provided. The width detector may detect a width of the following vehicle T. The possibility calculator 7 may correct the travel possibility, on the basis of the width of the following vehicle T detected by the width detector and on the basis of widths of the passing spaces S1 and S2 detected by the space detector 5.

Figure 4:
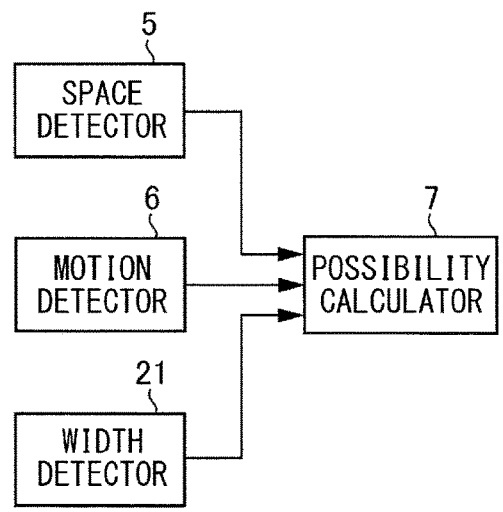
FIG. 4 is a block diagram of a main part of an image display device according to a second implementation.

For example, as illustrated in FIG. 4, in the first implementation, a width detector 21 may be newly provided. The width detector 21 may be coupled to the possibility calculator 7.

The width detector 21 may detect the width of the following vehicle T, i.e., a length in a right-left direction of the following vehicle T with respect to the advancing direction. In one preferred but non-limiting example, as the width detector 21, a camera may be used.

The space detector 5 may detect not only the positions of the passing spaces S1 and S2 but also the widths of the passing spaces S1 and S2, i.e., lengths in the right-left direction of the passing spaces S1 and S2 with respect to the advancing direction of the own vehicle.

The possibility calculator 7 may calculate the travel possibility that the following vehicle T travels through the passing space S1 or S2, on the basis of the motion of the following vehicle T detected by the motion detector 6 and on the basis of the positions of the passing spaces S1 and S2 detected by the space detector 5. Thereafter, the possibility calculator 7 may correct the travel possibility, on the basis of the width of the following vehicle T detected by the width detector 21 and on the basis of the widths of the passing spaces S1 and S2 detected by the space detector 5.

As with the first implementation, when the driver stops the own vehicle in front of the pedestrian W who waits to cross the road, the motion of the following vehicle T is detected by the motion detector 6. Moreover, the width detector 21 detects the width of the following vehicle T, while the space detector 5 detects the positions and the widths of the passing spaces S1 and S2.

Figure 5:
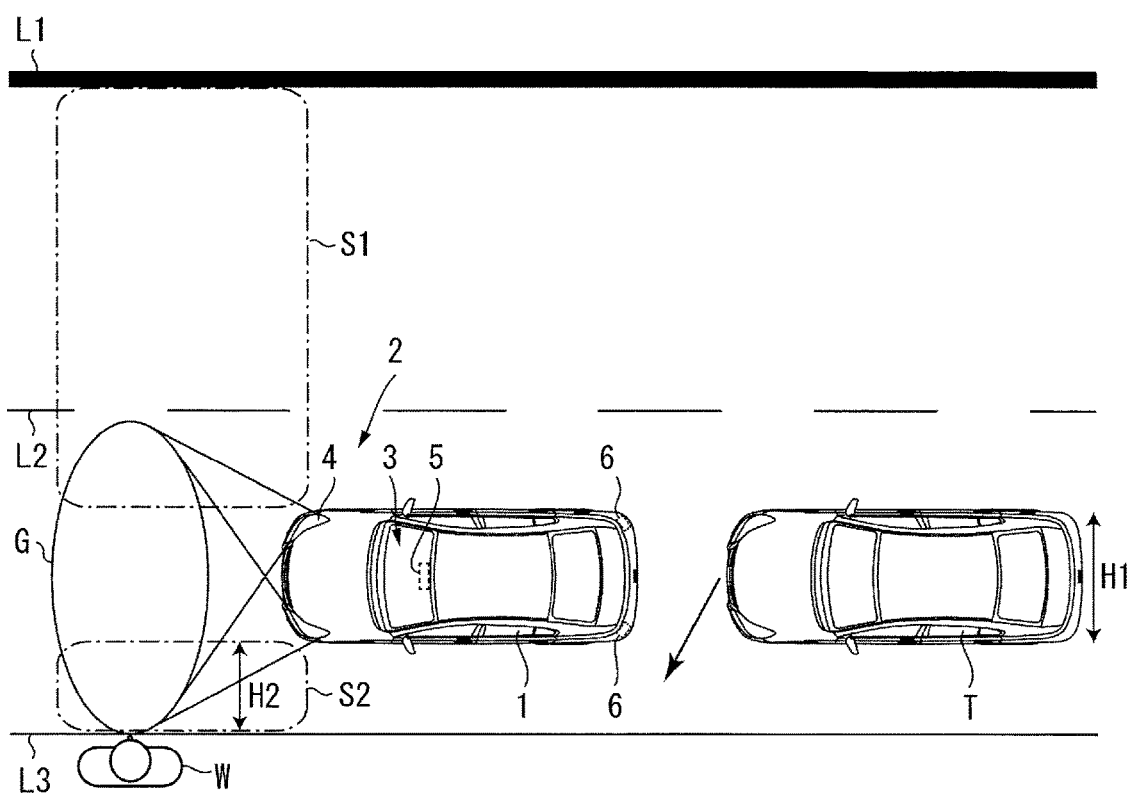
FIG. 5 illustrates how a motion detector according to the second implementation detects a motion of a following vehicle.

Here, as illustrated in FIG. 5, when the following vehicle T moves leftward, the motion of the following vehicle T is detected by the motion detector 6. In a case where a calculation result is obtained that the route of the following vehicle T includes the passing space S2, on the basis of the motion of the following vehicle T detected by the motion detector 6 and on the basis of the position of the passing space S2 detected by the space detector 5, the possibility calculator 7 brings the travel possibility to the predetermined value or more. At this occasion, the possibility calculator 7 determines that the width H1 of the following vehicle T is larger than the width H2 of the passing space S2, on the basis of the width H1 of the following vehicle T detected by the width detector 21 and on the basis of the width H2 of the passing space S2 detected by the space detector 5. Thus, the possibility calculator 7 determines that the following vehicle T is not able to travel through the passing space S2, and corrects the travel possibility to bring the travel possibility to a value smaller than the predetermined value.

Thus, the illumination controller 8 allows the light illuminator 4 to display the permission-to-cross image on the road in accordance with the operation performed with the operation unit 3.

In this implementation, the possibility calculator 7 may correct the travel possibility on the basis of the width H1 of the following vehicle T detected by the width detector 21 and on the basis of the widths H2 of the passing spaces S1 and S2 detected by the space detector 5. Hence, it is possible to display the more appropriate image G for the pedestrian W.

[Third Implementation]

In the first and the second implementations, in one preferred but non-limiting example, the possibility calculator 7 may obtain a detection range of the motion detector 6, and increase the travel possibility in a case where the detection range is a range of a predetermined distance or less.

Figure 6:
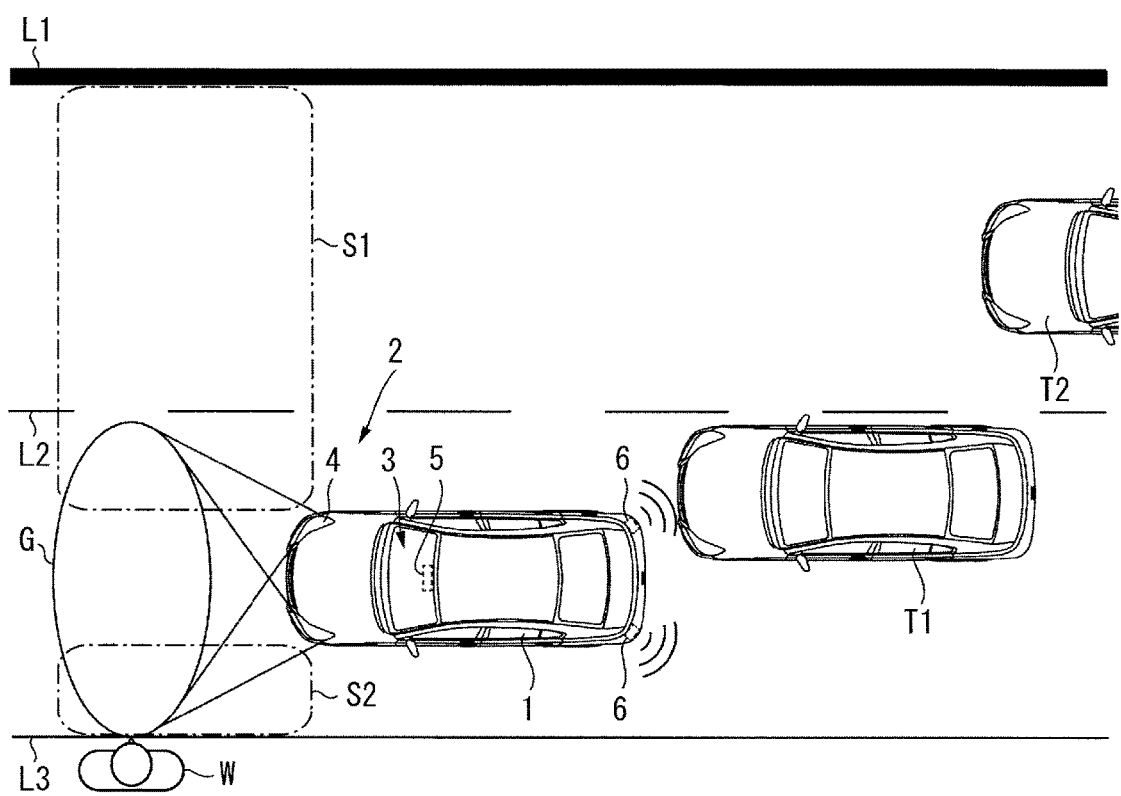
FIG. 6 illustrates how a motion detector according to a third implementation detects a motion of a following vehicle.

For example, as illustrated in FIG. 6, assume that a following vehicle T1 stops near the motion detector 6, and the motion detector 6 is not able to detect with high accuracy a following vehicle T2 that travels on the lane on the right side of the own vehicle.

Here, upon the motion of the following vehicle T1 detected by the motion detector 6 being inputted, the possibility calculator 7 calculates the travel possibility on the basis of the motion of the following vehicle T1, and obtains the detection range of the motion detector 6 on the basis of detection information of the motion detector 6. For example, the possibility calculator 7 may be able to obtain the detection range of the motion detector 6 on the basis of radar transmission and reception time involved in transmission to and reception from the motion detector 6.

At this occasion, in a case where the detection range of the motion detector 6 is the range of the predetermined distance or less because of a blockage by the following vehicle T1 that stops near the motion detector 6, i.e., in a case where the detection range of the motion detector 6 is a range of a distance or less at which the motion detector 6 becomes unable to detect the following vehicle T2 that travels on the lane on the right side of the own vehicle, the possibility calculator 7 brings the travel possibility through the passing space S1 to a value equal to or larger than the predetermined value, because there is possibility that the following vehicle T2 travels through the passing space S1.

It is to be noted that in a case where the passing space S1 is not detected by the space detector 5, the possibility calculator 7 may bring the travel possibility through the passing space S1 to a value smaller than the predetermined value, even if the detection range of the motion detector 6 is the range of the predetermined distance or less.

In this implementation, the possibility calculator 7 may increase the travel possibility, in the case where the detection range of the motion detector 6 is the range of the predetermined distance or less. Hence, it is possible to display the image G that allows for enhanced safety of the pedestrian W.

[Fourth Implementation]

In the first to the third implementations, the space detector 5 may detect the passing spaces S1 and S2 sideward of the own vehicle in which the following vehicle T passes by the own vehicle. However, spaces to be detected by the space detector 5 is not limited to the passing spaces S1 and S2, but may be any travel space sideward of the own vehicle through which a surrounding vehicle is able to travel.

Figure 7:
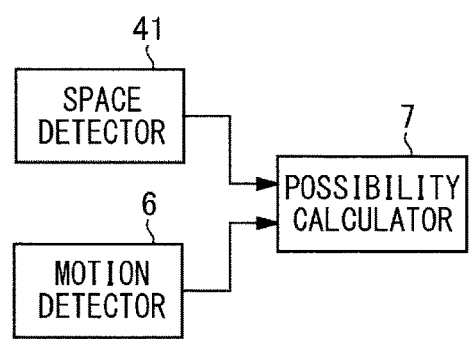
FIG. 7 is a block diagram of a main part of an image display device according to a fourth implementation.

For example, as illustrated in FIG. 7, a space detector 41 may be disposed instead of the space detector 5 in the first implementation.

Figure 8:
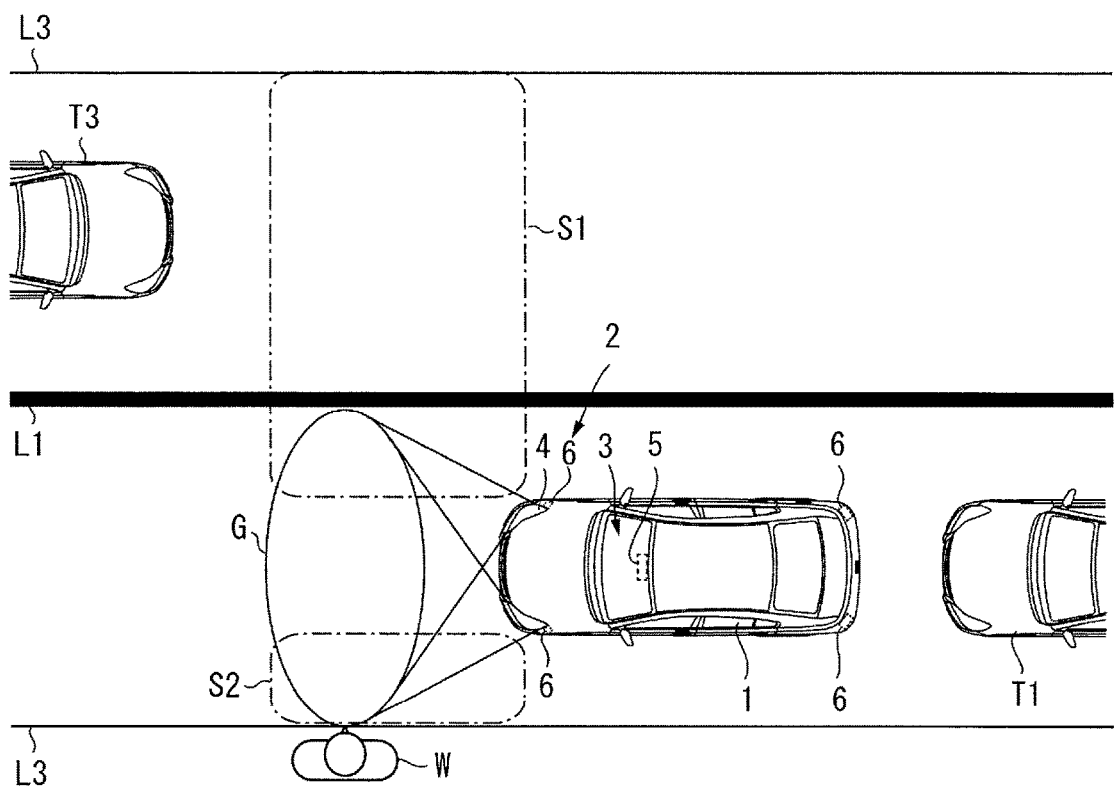
FIG. 8 illustrates how a space detector according to the fourth implementation detects a travel space.

The space detector 41 may detect the travel space sideward of the own vehicle through which the surrounding vehicle is able to travel. In one specific but non-limiting example, as illustrated in FIG. 8, the space detector 41 may detect the travel space S2 and a travel space S3 on the roads on both sides of the centerline L1 of the driveway, i.e., on the road on which the own vehicle travels and on the road on which an oncoming vehicle T3 travels. The travel spaces S2 and S3 are spaces through which the following vehicle T1 and the oncoming vehicle T3 travel. At this occasion, the space detector 41 may be able to detect the travel spaces S2 and S3 on the basis of the outlines L3 of the driveway. In other words, the space detector 41 may detect, as the travel space S3, a space between the right side of the automobile body 1 and the outline L3 of the driveway of the opposite lane, and detect, as the travel space S2, a space between the left side of the automobile body 1 and the outline L3 of the driveway of the lane on which the own vehicle travels.

The motion detector 6 may detect the motions of the following vehicle T1 and the oncoming vehicle T3. The motion detector 6 may be disposed in each of the rear part and the front part of the automobile body 1.

In one implementation of the technology, the following vehicle T1 and the oncoming vehicle T3 may each serve as the "second vehicle".

With this configuration, the space detector 41 detects the travel spaces S2 and S3. Moreover, the motion detector 6 disposed in the rear part of the automobile body 1 detects the motion of the following vehicle T1, while the motion detector 6 disposed in the front part of the automobile body 1 detects the motion of the oncoming vehicle T3. It is to be noted that in one preferred but non-limiting example, as the travel spaces S2 and S3, detected may be frontward spaces that extend from near the front part of the own vehicle to a region where the pedestrian W crosses.

Thereafter, the possibility calculator 7 calculates the travel possibility that the following vehicle T1 travels through the travel space S2, on the basis of the motion of the following vehicle T1 detected by the motion detector 6, and calculates the travel possibility that the oncoming vehicle T3 travels through the travel space S3, on the basis of the motion of the oncoming vehicle T3. In a case where each of the travel possibility is equal to or larger than the predetermined value, the possibility calculator 7 controls the light illuminator 4 to display the no-crossing image. Meanwhile, in a case where each of the travel possibility is smaller than the predetermined value, the possibility calculator 7 controls the light illuminator 4 to display the permission-to-cross image in accordance with the operation performed with the operation unit 3.

In this implementation, the possibility calculator 7 may calculate not only the travel possibility that the following vehicle T1 travels through the travel space S2 but also the travel possibility that the oncoming vehicle T3 travels through the travel space S3. Hence, it is possible to display the image G that allows for enhanced safety of the pedestrian W.

[Fifth Implementation]

In the first to the fourth implementations, the possibility calculator 7 may calculate the travel possibility that the surrounding vehicle travels through the travel space, on the basis of the motion of the surrounding vehicle detected by the motion detector 6. However, the possibility calculator 7 is not limited to calculating the travel possibility on the basis of the motion of the surrounding vehicle. The possibility calculator 7 may calculate the travel possibility on the basis of any travel information regarding how the surrounding vehicle travels on the road.

Figure 9:
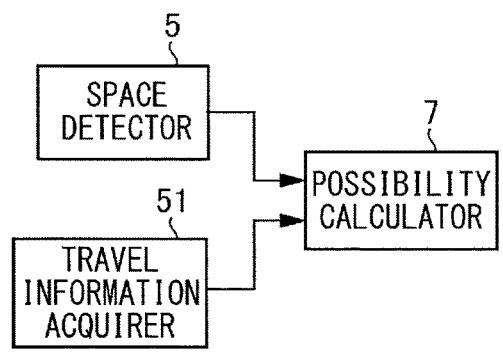
FIG. 9 is a block diagram of a main part of an image display device according to a fifth implementation.

For example, as illustrated in FIG. 9, a travel information acquirer 51 may be disposed instead of the motion detector 6 in the first implementation. The travel information acquirer 51 may acquire travel information regarding how the surrounding vehicle travels on the road. Non-limiting examples of the travel information may include surrounding-vehicle approach information, information regarding a traffic jam on the road, and information regarding traffic regulation. The travel information acquirer 51 may include, for example, a car navigation system and an inter-vehicle communication system.

The possibility calculator 7 may calculate the travel possibility on the basis of the travel information acquired by the travel information acquirer 51 and on the basis of the position of the travel space detected by the space detector 5.

It is to be noted that the travel information acquirer 51 may be disposed together with the motion detector 6.

In this implementation, the possibility calculator 7 may calculate the travel possibility on the basis of the travel information acquired by the travel information acquirer 51. Hence, it is possible to display the appropriate image G for the pedestrian W. However, in one preferred but non-limiting example, the possibility calculator 7 may calculate the travel possibility, on the basis of the motion of the surrounding vehicle detected by the motion detector 6.

It is to be noted that in the first to the fifth implementations as described above, the operation unit 3 may be eliminated. In other words, the illumination controller 8 may automatically select, on the basis of the travel possibility, the image G to be displayed on the road. The illumination controller 8 may control the light illuminator 4 to display the image G thus selected. For example, in a case where the travel possibility is equal to or larger than the predetermined value, the illumination controller 8 may control the light illuminator 4 to display the no-crossing image. In a case where the travel possibility is smaller than the predetermined value, the illumination controller 8 may control the light illuminator 4 to display the permission-to-cross image.

Moreover, in the first to the fifth implementations as described above, the space detector may detect the single travel space right-sideward of the own vehicle and the single travel space left-sideward of the own vehicle. However, the number of the travel spaces to be detected by the space detector is not limited to as exemplified above. The space detector may detect any travel space sideward of the own vehicle through which the surrounding vehicle is able to travel.

Figure 10:
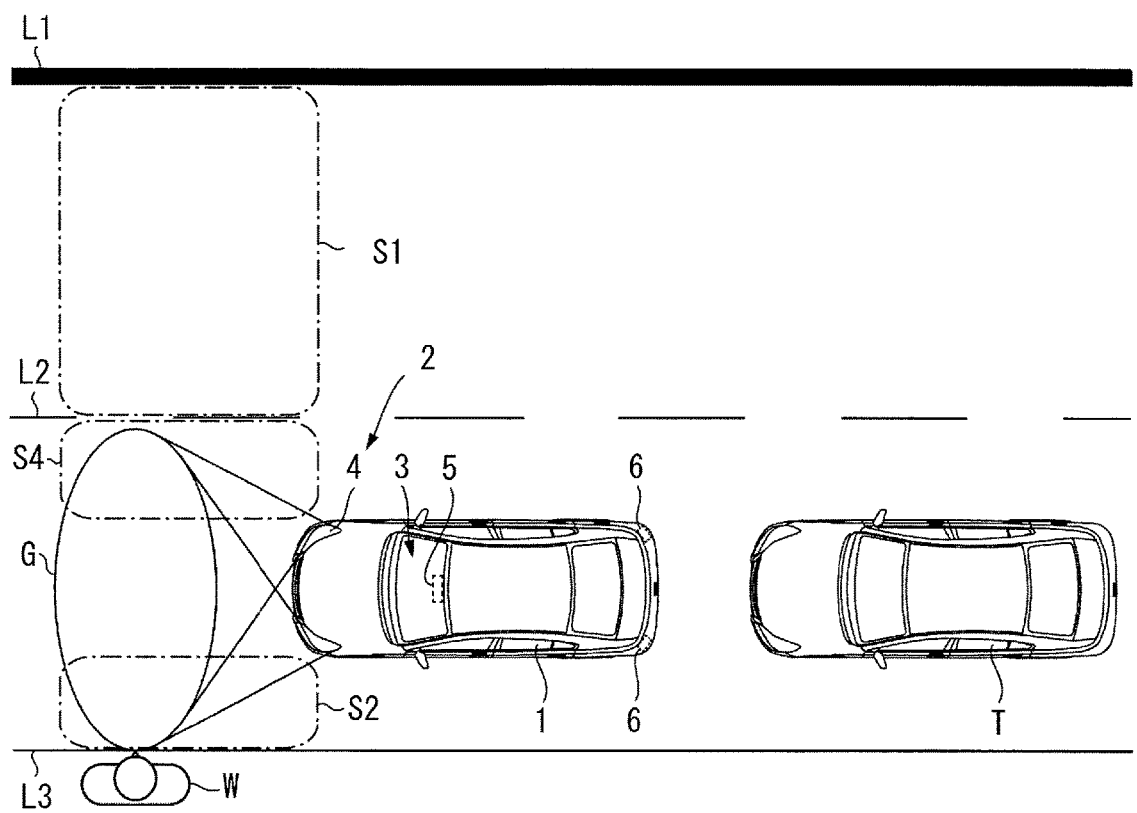
FIG. 10 illustrates how a space detector according to a modification example of the first to the fifth implementations detects a travel space.

For example, as illustrated in FIG. 10, in the first implementation, the space detector 5 may detect passing spaces S4 and S5 at two locations right-sideward of the own vehicle. Here, the passing space S4 is a space between the right side of the own vehicle and the lane borderline L2 of the driveway. The passing space S5 is a space between the lane borderline L2 of the driveway and the centerline L1 of the driveway. This makes it possible for the space detector 5 to detect the passing space S5 corresponding to an automobile, and to detect the passing spaces S2 and S4 corresponding to the motorbike and the bicycle.

As described, allowing the space detector 5 to detect the passing spaces S2, S4, and S5 in accordance with the kinds of the surrounding vehicle makes it possible for the possibility calculator 7 to calculate the travel possibility with more enhanced accuracy.

Furthermore, in the first to the fifth implementations as described above, the light illuminator 4 may be unitized with the headlights of the automobile body 1. However, the light illuminator 4 may be disposed separately from the headlights. The light illuminator 4 may include various kinds of light sources, e.g., a lamp, a light emitting diode (LED), a digital mirror device, and a projector.

In one implementation described above, the possibility calculator 7 and the illumination controller 8 illustrated in FIGS. 2, 4, 7, and 9 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the possibility calculator 7 and the illumination controller 8. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIGS. 2, 4, 7, and 9.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An image display device, comprising:
a light illuminator configured to send out visible light frontward of a first vehicle as an own vehicle, to display an image on a road a pedestrian is going to cross;
a space detector configured to detect a travel space sideward of the first vehicle, the travel space being a road space through which a second vehicle other than the first vehicle is able to travel;
a travel information acquirer configured to acquire travel information regarding how the second vehicle travels on the road;
a possibility calculator configured to calculate an estimated travel possibility that the second vehicle travels through the travel space, based on the travel information acquired by the travel information acquirer and a position of the travel space detected by the space detector; and
an illumination controller configured to control the light illuminator to display a no-crossing image on a condition that the travel possibility calculated by the possibility calculator is equal to or larger than a predetermined value, the no-crossing image indicating to the pedestrian to not cross the road.

2. The image display device according to claim 1, wherein the travel space is a passing space in which the second vehicle passes by the first vehicle.

3. The image display device according to claim 1, wherein the traveling information acquirer includes a motion detector that detects a motion of the second vehicle, and
the possibility calculator calculates the travel possibility, on a basis of the motion of the second vehicle detected by the motion detector.

4. The image display device according to claim 2, wherein the traveling information acquirer includes a motion detector that detects a motion of the second vehicle, and
the possibility calculator calculates the travel possibility, on a basis of the motion of the second vehicle detected by the motion detector.

5. The image display device according to claim 3, wherein the possibility calculator obtains a detection range of the motion detector, and increases the travel possibility on a condition that the detection range is a range of a predetermined distance or less.

6. The image display device according to claim 4, wherein the possibility calculator obtains a detection range of the motion detector, and increases the travel possibility on a condition that the detection range is a range of a predetermined distance or less.

7. The image display device according to claim 1, wherein the travel information acquirer includes a width detector that detects a width of the second vehicle, and
the possibility calculator corrects the travel possibility, on a basis of the width of the second vehicle detected by the width detector and on a basis of a width of the travel space detected by the space detector.

8. The image display device according to claim 2, wherein the travel information acquirer includes a width detector that detects a width of the second vehicle, and
the possibility calculator corrects the travel possibility, on a basis of the width of the second vehicle detected by the width detector and on a basis of a width of the travel space detected by the space detector.

9. The image display device according to claim 3, wherein the travel information acquirer includes a width detector that detects a width of the second vehicle, and
the possibility calculator corrects the travel possibility, on a basis of the width of the second vehicle detected by the width detector and on a basis of a width of the travel space detected by the space detector.

10. The image display device according to claim 4, wherein
the travel information acquirer includes a width detector that detects a width of the second vehicle, and
the possibility calculator corrects the travel possibility, on a basis of the width of the second vehicle detected by the width detector and on a basis of a width of the travel space detected by the space detector.

11. The image display device according to claim 1, wherein
the light illuminator includes headlights.

12. The image display device according to claim 2, wherein
the light illuminator includes headlights.

13. The image display device according to claim 3, wherein
the light illuminator includes headlights.

14. The image display device according to claim 4, wherein
the light illuminator includes headlights.

15. The image display device according to claim 1, wherein
the illumination controller controls the light illuminator when the first vehicle stops in front of the pedestrian who waits to cross the road.

16. An image display device, comprising:
a light illuminator configured to send out visible light frontward of a first vehicle as an own vehicle, to display an image on a road a pedestrian is going to cross;
a space detector configured to detect a travel space sideward of the first vehicle, the travel space being a road space through which a second vehicle other than the first vehicle is able to travel;
a travel information acquirer configured to acquire travel information regarding how the second vehicle travels on the road; and
circuitry configured to:
control the light illuminator, based on the travel information acquired by the travel information acquirer and a position of the travel space detected by the space detector,
calculate an estimated travel possibility that the second vehicle travels through the travel space, on the basis of the travel information acquired by the travel information acquirer and on the basis of the position of the travel space detected by the space detector, and
control the light illuminator to display a no-crossing image on a condition that the travel possibility is equal to or larger than a predetermined value, the no-crossing image indicating to the pedestrian to not cross the road.

* * * * *